United States Patent
Ravier

(10) Patent No.: US 7,252,417 B2
(45) Date of Patent: Aug. 7, 2007

(54) BENDING LIGHT AND DIPPED BEAM HEADLAMP FOR A MOTOR VEHICLE

(75) Inventor: Jean-Paul Ravier, Bobigny Cedex (FR)

(73) Assignee: Valeo Vision, Bobigny Cedex (FR)

( * ) Notice: Subject to any disclaimer, the term of this patent is extended or adjusted under 35 U.S.C. 154(b) by 115 days.

(21) Appl. No.: 10/899,526

(22) Filed: Jul. 27, 2004

(65) Prior Publication Data
US 2005/0047153 A1    Mar. 3, 2005

(30) Foreign Application Priority Data
Aug. 1, 2003    (FR) .................................. 03 09565

(51) Int. Cl.
*B60Q 1/00*    (2006.01)
(52) U.S. Cl. .................. 362/464; 362/37; 362/41; 362/465; 362/545; 315/82
(58) Field of Classification Search ................ 362/465, 362/545, 37, 41, 464; 315/82
See application file for complete search history.

(56) References Cited

U.S. PATENT DOCUMENTS

| | | | |
|---|---|---|---|
| 5,404,278 A | 4/1995 | Shibata et al. | |
| 5,455,747 A | 10/1995 | Aoyama | |
| 6,634,778 B2* | 10/2003 | Tatsukawa | 362/523 |
| 2002/0015308 A1 | 2/2002 | Naganawa et al. | |
| 2002/0196634 A1* | 12/2002 | Jeannot | 362/464 |
| 2004/0263346 A1* | 12/2004 | Neal | 340/815.45 |

FOREIGN PATENT DOCUMENTS

DE    44 21 306 A1    1/1995
FR    2 776 366 A1    9/1999

OTHER PUBLICATIONS

French Patent Office; "French Search Report" dated Apr. 1, 2004; corresponding to French Patent Application No. FR 03 09 565; (2 pages).

* cited by examiner

*Primary Examiner*—Stephen F Husar
*Assistant Examiner*—Meghan K. Dunwiddie
(74) *Attorney, Agent, or Firm*—Morgan & Finnegan LLP

(57) ABSTRACT

The bonding light and dipped beam headlamp for a motor vehicle comprises at least two light sources with at least one first source having a cut-off of the dipped beam type and at least one second source having a cut-off of the flat type, which is placed outside the first source so as to illuminate into a turn to its side; means that are sensitive to the trajectory of the vehicle so as to supply a signal that depends on the nature of the route followed by the vehicle; and means for increasing the brightness of the flat cut-off source in the event of a turn to the side of this source, in response to the supplied signal.

8 Claims, 1 Drawing Sheet

BENDING LIGHT AND DIPPED BEAM HEADLAMP FOR A MOTOR VEHICLE

Figure 1:
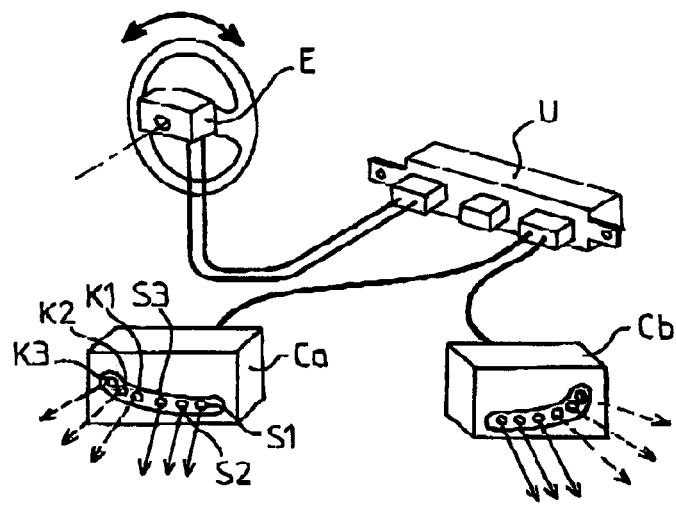

The invention relates to a bending light and dipped beam headlamp for a motor vehicle.

In general, in a headlamp comprising a dipped beam function and a bending light function, the respective optical systems are dissociated and thus require a large front surface area of the headlamp. This requirement can lead to a limitation of the use of the bending light and dipped beam headlamp with respect to medium- and low-range vehicles since the surface allowed for headlamps in these types of vehicles is smaller than in the case of high-range vehicles. Moreover, economic constraints are more severe for medium- or low-range vehicles.

The aim of the invention is above all to provide a bending light and dipped beam headlamp which is of smaller size and of acceptable cost for equipping medium- and low-range vehicles.

According to the invention, a bending light and dipped beam headlamp for a motor vehicle is characterized in that it comprises at least two light sources with at least one first source having a cut-off, in particular a cut-off of the dipped beam type, for example in the form of a V or with a kink (the definition of the cut-off is given in the regulations in force, in particular the American, European and Japanese regulations) and at least one second source having a cut-off which is at least partially flat, which is placed outside the first source so as to illuminate into a turn to its side;

means that are sensitive to the trajectory of the vehicle so as to supply a signal that depends on the nature of the route followed by the vehicle;

and means for increasing the brightness of the source (or of at least one of the sources) having a flat cut-off in tho event of a turn to the side of this (these) source(s), in response to the supplied signal.

Preferably, the second source or sources (K1) has/have a cut-off which is entirely flat or which is flat up to a certain horizontal angle.

Advantageously, the two types of sources may be distinguished in that they have different cut-offs; for example, the first in the form of a V and the second a flat cut-off, although this example of embodiment is non-limiting.

Preferably, a number of first sources having a cut-off of the dipped beam type, in particular in the form of a V, are provided with their optical axes parallel and a number of second sources having a flat cut-off are provided with their optical axes inclined towards the outside with respect to the longitudinal axis of the vehicle.

The inclination of the axes of the sources having a flat cut-off may increase towards the outside.

When the headlamp is switched on, the sources having a dipped beam cut-off and the sources having a flat cut off may be continuously supplied with power and, during turning, the increase in the brightness of the sources having a flat cut-off is obtained by boosting the power supply to these sources. A progression of the power boosting may be provided from the least inclined second source to the most inclined second source. The light sources which are oriented towards the outside of the turn may be undersupplied with power for the purpose of keeping the temperature of the system for cooling the sources at a nominal mean level.

According to another possibility, when the headlamp is switched on, only some of the sources having a flat cut-off, namely those that are closest to the sources having a dipped beam cut-off, are continuously supplied with power, whereas the extreme sources having a flat cut-off are switched on only during the turning phases.

Advantageously, the light sources consist of modules comprising one or more light-emitting diodes.

The invention also relates to a motor vehicle equipped with at least one headlamp as defined above.

Figure 2:
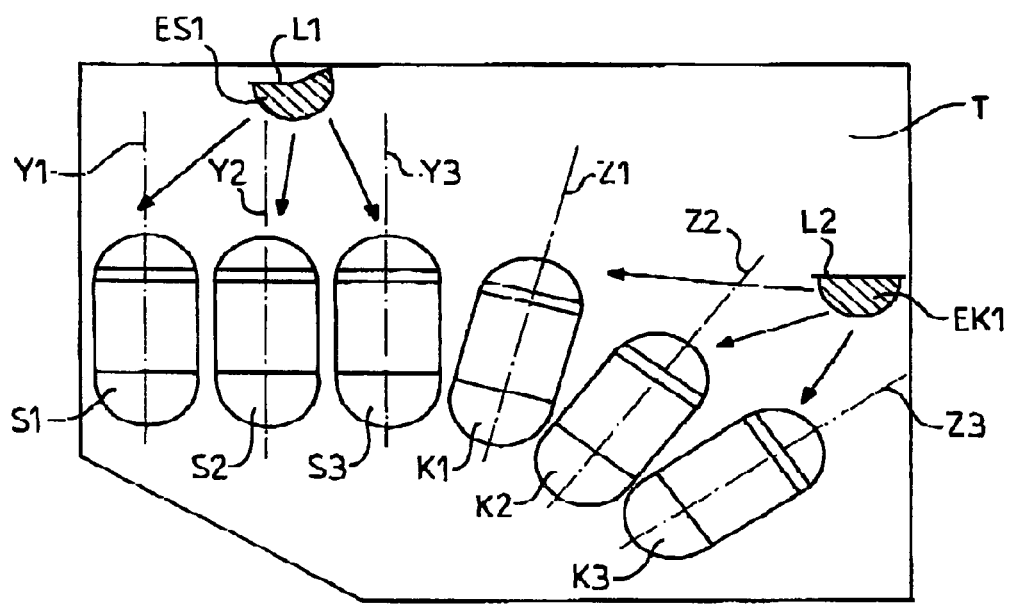
Figure 3:
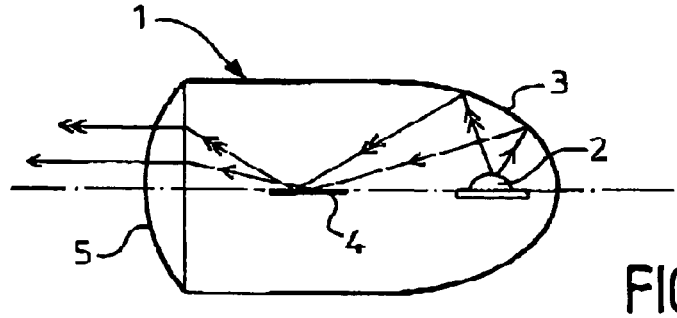

The invention consists, apart from what has been stated above, in a certain number of other provisions which will be discussed explicitly below with respect to an example of embodiment which is described with reference to the attached drawings, but which is in no way limiting. In the drawings:

FIG. 1 is a perspective diagram of a lighting installation on a vehicle, comprising two bending light and dipped beam headlamps according to the invention, FIG. 2 is a schematic plan view on a larger scale of the headlamp situated on the right-hand side of the vehicle, and FIG. 3 is a schematic vertical section of an LED module.

Referring to FIG. 1 of the drawings, there can be seen part of a lighting installation on a motor vehicle, which comprises, on each side, at the front of the vehicle, a bending light and dipped beam headlamp Ca on the right-hand side and Cb on the left-hand side. Each headlamp is connected by a multiconductor cable to a control unit U.

Means E that are sensitive to the trajectory of the vehicle comprise a steering wheel sensor and provide the unit U with a signal which depends on the nature of the route followed by the vehicle. The sensitive means E could comprise a camera or a GPS navigator in addition to or instead of the steering wheel sensor.

Each bending light and dipped beam headlamp Ca, Cb comprises at least two light sources S1, K1 with at least one first source S1 having a dipped beam cut-off in the form of a V and at least one second source K1 having a flat cut-off, which is placed outside the first source S1. The second source K1 makes it possible to illuminate into a turn to its side.

In FIG. 2, the right-hand headlamp Ca is turned 180° with respect to FIG. 1 so that the front zone illuminated by the headlamp is located at the top. The sectors ES1 and EK1 schematically represent the zones illuminated by the sources S1, K1 on a vertical screen. The source S1 having a dipped beam cut-off essentially illuminates below a cut-off line L1 in the form of a V comprising, in the case of a vehicle with right-hand drive, a horizontal segment to the left and an oblique segment rising to the right at an angle of approximately 15° with respect to the horizontal. The illuminated zone is situated below this line L1.

The source K1 having a flat cut-off essentially illuminates below a horizontal line L2.

Preferably, three first light sources S1, S2, S3 having a cut-off in the form of a V are provided with their optical axes Y1, Y2, Y3 parallel to one another and to the longitudinal axis of the vehicle. Three second light sources having a flat cut-off K1, K2, K3 are provided outside the sources having a cut-off in the form of a V.

The optical axes Z1, Z2, Z3 of the sources K1, K2, K3 are inclined towards the outside with respect to the axis of the vehicle. Preferably, the inclination of the axes Z1-Z3 increases from the source K1, which is closest to the source S1, to the extreme source K3.

The control means U are provided to cause an increase in the brightness of the sources K1-K3 having a flat cut-off in the event of a turn to their side, so as to better illuminate the inside of the turn.

The increase in the brightness is brought about in response to a signal received from the means E which are sensitive to the trajectory.

Each light source advantageously consists of a module 1 (FIG. 3) comprising an LED 2 (light-emitting diode). The light sources are mounted on a support T, which is housed in the casing of the headlamp Ca, such that it is possible for their orientation to be adjusted. The mounting of the headlamp Cb is similar.

As can be seen in FIG. 3, each module 1 comprises a semi-ellipsoidal reflector 3. An LED 2 is located at the inner focus of the reflector 3 and is oriented so that the axis of its light beam is orthogonal to the optical axis. The beam returned by the reflector 3 falls on a reflective metal plate 4, generally referred to as a refractor, which may be flat to give the flat cut-off L2 or folded in the form of a dihedron to give the cut-off L1 in the form of a V. The plate 4 is located at the external focus of the reflector 3 or in the vicinity thereof. A convergent lens 5 is placed at the exit of the module 1. The modules of sources K1-K3 having a flat cut-off may be entirely or partially common with modules used for a tapering bending light function. According to such a bending light function, the modules are switched on progressively from the inner module to the outer module so as to follow the turn.

Various configurations are possible for combining the normal dipped beam and bending light dipped beam functions.

According to a first configuration, when the headlamp is switched on, the first sources S1-S3 having a dipped beam cut-off are continuously supplied with power and only some of the sources having a flat cut-off, for example the source K1 next to the source S3, are likewise continuously supplied with power, that is to say in a straight line as well as during turns; the extreme second sources such as K2, K3 are supplied with power only during the phases of turning to their side (for example turning to the right for the sources K2, K3 of the right-hand headlamp). As a variant, none of the second sources having a flat cut-off are supplied with power in a straight line when the headlamp is switched on, and some or all of the second sources are supplied with power only during the phases of turning to their side.

According to a second configuration, when the headlamp is switched on, all the light sources S1-S3 and K1-K3 are supplied with power in a straight line, and in the event of a turn to the side of the headlamp in question the extreme second sources in the direction of the turn, such as K3 and possibly K2, are boosted with power so as to better illuminate the turn, in particular in proportion to the amplitude of the turn. The unit U may control a progression of the power boosting from a less inclined second source, such as K2, to the most inclined second source K3.

The electrical supply diagram is conventional for an association of dipped beam and static bending light headlamp. According to the second configuration, only the current values are greater than for a conventional power supply, for example 700 mA instead of 350 mA for the light-emitting diodes currently available.

The mode of operation of the headlamp can be found from the explanations given above. When the headlamp is switched on and the vehicle is travelling in a straight line, the sources S1, S2, S3 are supplied with power. The second sources K1-K3 or some thereof are kept switched off and are switched on only during a turn to the side of these second sources.

According to another possibility, the sources K1-K3 are switched on at the same time as the sources S1-S3. During a turn, the sources K1, K2, K3 are boosted with power, possibly with a progression from the module K1 which is least inclined with respect to the longitudinal axis of the vehicle to the most inclined module K3. The modules oriented towards the outside of the turn may be undersupplied with power, the aim being to keep the temperature of the system for cooling the diode at a nominal mean level which corresponds to the recommended characteristics.

The increase in the brightness of the sources K1 to K3 may be progressive so as to create an impression of tapering of the light beam and following the turn. In particular, the sources K1 to K3 may be switched on successively.

The invention allows optimized integration with a gain in space. A dynamic effect sensation can be produced by controlling the modules individually as a function of the amplitude of the signal indicating the angle of the steering wheel. It is possible to obtain a static bending light lamp function with the same number of light sources, in particular LEDs, as a normal dipped beam, or with a limited increase in this number.

The invention claimed is:

1. Bending light and dipped beam headlamp for a motor vehicle, comprising:
    light sources with at least one first source having a cut-off, in particular of the dipped beam type, and at least two second sources each having a cut-off which is at least partially flat, which is placed outside the first source so as to illuminate into a turn to its side;
    means that are sensitive to the trajectory of the vehicle so as to supply a signal that depends on the nature of the route followed by the vehicle; and
    means for increasing the brightness of at least one of the sources having a cut-off that is at least partially flat in the event of a turn to the side of this (these) source(s), in response to the supplied signal,
    wherein a number of first sources are provided with their optical axes parallel and in that a number of second sources are provided with their optical axes inclined towards the outside with respect to the longitudinal axis of the vehicle.

2. Bending light and dipped beam headlamp for a motor vehicle, comprising: at least two light sources with at least one first source having a cut-off, in particular of the dipped beam type, and at least one second source having a cut-off which is at least partially flat, which is placed outside the first source so as to illuminate into a turn to its side; means that are sensitive to the trajectory of the vehicle so as to supply a signal that depends on the nature of the route followed by the vehicle; and means for increasing the brightness of at least one of the sources having a cut-off that is at least partially flat in the event of a turn to the side of this (these) source(s), in response to the supplied signal,
    wherein the inclination of the optical axes of the second sources increases towards the outside with respect to the longitudinal axis of the vehicle.

3. Bending light and dipped beam headlamp for a motor vehicle, comprising: at least two light sources with at least one first source having a cut-off, in particular of the dipped beam type, and at least one second source having a cut-off which is at least partially flat, which is placed outside the first source so as to illuminate into a turn to its side; means that are sensitive to the trajectory of the vehicle so as to supply a signal that depends on the nature of the route followed by the vehicle; and means for increasing the brightness of at least one of the sources having a cut-off that is at least partially flat in the event of a turn to the side of this (these) source(s), in response to the supplied signal, wherein, when the headlamp is switched on, the first sources and the second sources are continuously supplied with power and that, during a turn, the increase in the brightness of the second sources is obtained by boosting the power supply to these sources, and wherein a progression of the power boosting is provided from a least inclined second source to a most inclined second source of the second sources.

4. Headlamp according to claim 3, wherein the light sources which are oriented towards the outside of the turn are undersupplied with power for the purpose of keeping the temperature of the system for cooling the sources at a nominal mean level.

5. Bending light and dipped beam headlamp for a motor vehicle, comprising:

light sources with at least one first source having a cut-off, in particular of the dipped beam type, and at least two second sources each having a cut-off which is at least partially flat, which is placed outside the first source so as to illuminate into a turn to its side;

means that are sensitive to the trajectory of the vehicle so as to supply a signal that depends on the nature of the route followed by the vehicle; and means for increasing the brightness of at least one of the sources having a cut-off that is at least partially flat in the event of a turn to the side of this (these) source(s), in response to the supplied signal, wherein, when the headlamp is switched on, only some of the second sources namely those that are closest to the first sources, are continuously supplied with power, whereas the extreme second sources are switched on only during the turning phases.

6. Bending light and dipped beam headlamp for a motor vehicle, comprising:

light sources with a plurality of first sources each having a cut-off, in particular of the dipped beam type, and at least two second sources each having a cut-off which is at least partially flat, which is placed outside the first source so as to illuminate into a turn to its side;

means that are sensitive to the trajectory of the vehicle so as to supply a signal that depends on the nature of the route followed by the vehicle; and means for increasing the brightness of at least one of the sources having a cut-off that is at least partially flat in the event of a turn to the side of this (these) source(s), in response to the supplied signal, wherein the first sources each have a dipped beam cut-off continuously supplied with power and at least one of the second sources is continuously supplied with power.

7. Bending light and dipped beam headlamp for a motor vehicle, comprising:

light sources with at least one first source having a cut-off, in particular of the dipped beam type, and at least two second sources each having a cut-off which is at least partially flat, which is placed outside the first source so as to illuminate into a turn to its side;

means that are sensitive to the trajectory of the vehicle so as to supply a signal that depends on the nature of the route followed by the vehicle; and means for increasing the brightness of at least one of the sources having a cut-off that is at least partially flat in the event of a turn to the side of this (these) source(s), in response to the supplied signal, wherein none of the second sources are supplied with power in a straight line when the headlamp is switched on, and at least one of the second sources is supplied with power only during the phases of turning to its side.

8. Bending light and dipped beam headlamp for a motor vehicle, comprising:

light sources with a plurality of first sources each having a cut-off, in particular of the dipped beam type, and at least two second sources each having a cut-off which is at least partially flat, which is placed outside the first source so as to illuminate into a turn to its side;

means that are sensitive to the trajectory of the vehicle so as to supply a signal that depends on the nature of the route followed by the vehicle; and means for increasing the brightness of at least one of the sources having a cut-off that is at least partially flat in the event of a turn to the side of this (these) source(s), in response to the supplied signal, wherein all of the first and second light sources are supplied with power in a straight line when the headlamp is switched on.

* * * * *